United States Patent
Choi et al.

(10) Patent No.: US 12,435,653 B2
(45) Date of Patent: Oct. 7, 2025

(54) COOLING DEVICE FOR REDUCING AGENT DOSING MODULE

(71) Applicant: LS MTRON LTD., Anyang-si (KR)

(72) Inventors: Chan Hwan Choi, Anyang-si (KR); Hyun Seok Kim, Anyang-si (KR); Seung Tae Lee, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 0 days.

(21) Appl. No.: 18/716,416

(22) PCT Filed: Nov. 25, 2022

(86) PCT No.: PCT/KR2022/018792
§ 371 (c)(1),
(2) Date: Jun. 4, 2024

(87) PCT Pub. No.: WO2023/113286
PCT Pub. Date: Jun. 22, 2023

(65) Prior Publication Data
US 2025/0035025 A1    Jan. 30, 2025

(30) Foreign Application Priority Data
Dec. 15, 2021   (KR) .................. 10-2021-0179872

(51) Int. Cl.
*F01N 3/20*        (2006.01)

(52) U.S. Cl.
CPC ........ *F01N 3/2066* (2013.01); *F01N 2260/02* (2013.01); *F01N 2610/11* (2013.01)

(58) Field of Classification Search
CPC ........ F01N 3/2066; F01N 3/208; F01N 3/206; F01N 3/2006; F01N 2260/02;
(Continued)

(56) References Cited

U.S. PATENT DOCUMENTS 8,241,598 B2 * 8/2012 Frederiksen .......... F01N 3/2066
                                                   165/104.19
8,740,113 B2 * 6/2014 Roessle ................. F01N 3/2066
                                                   239/585.4
(Continued)

FOREIGN PATENT DOCUMENTS

CN         202484510 U    10/2012
KR       1019970066422 A   10/1997
(Continued)

OTHER PUBLICATIONS

KR 10 2016 0097616 (Year: 2024).*
(Continued)

*Primary Examiner* — Dapinder Singh
(74) *Attorney, Agent, or Firm* — K&L Gates LLP (57) ABSTRACT

The present disclosure relates to a cooling device for a reducing agent dosing module, the cooling device including: a first cooling part connected to a reducing agent dosing module; and a second cooling part connected to a cooling fluid line, and configured to receive cooling fluid from the cooling fluid line; wherein the second cooling part is formed to have an inner diameter larger than that of the first cooling part so that the bubbles generated due to the vaporization of cooling fluid are discharged.

4 Claims, 5 Drawing Sheets

(58) Field of Classification Search
CPC ............. F01N 2610/11; F01N 2610/14; F01N 2610/1453; F01N 2610/1486; Y02T 10/12; Y02A 50/20
See application file for complete search history.

(56) References Cited

U.S. PATENT DOCUMENTS

| | | | |
|---|---|---|---|
| 9,541,335 B2* | 1/2017 | Kowada | F28D 15/00 |
| 9,890,680 B1 | 2/2018 | Mcfarland et al. | |
| 9,920,681 B2* | 3/2018 | Owaki | F01P 5/12 |
| 2011/0061833 A1* | 3/2011 | Kihara | F01P 11/0285 165/51 |
| 2015/0144305 A1* | 5/2015 | Kowada | F01N 3/2066 165/104.19 |
| 2015/0211401 A1* | 7/2015 | Kamada | F01N 3/2066 60/298 |
| 2019/0162107 A1* | 5/2019 | Schmitz | F01P 11/0285 |

FOREIGN PATENT DOCUMENTS

| | | |
|---|---|---|
| KR | 20160097616 A | 8/2016 |
| KR | 20170052861 A | 5/2017 |
| KR | 101758599 B1 | 7/2017 |
| KR | 20190094751 A | 8/2019 |
| KR | 20210075390 A | 6/2021 |

OTHER PUBLICATIONS

KR 10 2019 0094751 (Year: 2024).*
International Search Report for related International Application No. PCT/KR2022/018792; action dated Jun. 22, 2023; (2 pages).
Written Opinion for related International Application No. PCT/KR2022/018792; action dated Jun. 22, 2023; (4 pages).

* cited by examiner

COOLING DEVICE FOR REDUCING AGENT DOSING MODULE

CROSS-REFERENCE TO RELATED APPLICATION

This application is a National Stage of International Application No. PCT/KR2022/018792, filed Nov. 25, 2022, which claims priority to and the benefit of Korean Patent Application No. 10-2021-0179872, filed Dec. 15, 2021, the disclosures of which are incorporated herein by reference in its entirety.

FIELD

The present disclosure relates to a cooling device for a reducing agent dosing module that is used to cool a reducing agent dosing module for reducing air pollutants discharged from a vehicle.

BACKGROUND

A reducing agent dosing module neutralizes pollutants contained in exhaust gas discharged from a vehicle. In particular, the reducing agent dosing module may be used to neutralize air pollutants contained in exhaust gas discharged from a vehicle that uses diesel as its fuel. For example, the reducing agent dosing module may prevent nitrogen oxides and sulfur oxides from being discharged into the air by neutralizing nitrogen oxides and sulfur oxides classified as air pollutants. In particular, the reducing agent dosing module may convert nitrogen oxides contained in the exhaust gas into water and nitrogen by spraying a reducing agent, such as urea water, into the exhaust gas.

This reducing agent dosing module may be installed near the exhaust port of a vehicle through which exhaust gas is discharged. The exhaust gas discharged from a vehicle is discharged as a result of combustion reactions occurring in the engine of the vehicle and may be discharged at high temperature. Accordingly, the reducing agent dosing module may be overheated by the exhaust gas and maintained at a high temperature. When the reducing agent dosing module is maintained at a high temperature, the crystallization of urea water used as the reducing agent occurs. When urea water reaches a specific temperature or higher, the crystallization of the urea water occurs as described above and blocks the reducing agent dosing module, thus causing a problem in which the reducing agent dosing module does not operate appropriately.

Accordingly, a reducing agent dosing module according to the prior art is implemented to prevent itself from being overheated by providing a cooling device for a reducing agent dosing module. The cooling device for a reducing agent dosing module according to the prior art may include a cooling tank and a cooling part. In this case, the cooling device for a reducing agent dosing module according to the prior art is implemented such that the cooling fluid contained in the cooling tank flows toward the reducing agent dosing module through the cooling part. Through this, the cooling device for a reducing agent dosing module according to the prior art is implemented such that the cooling fluid supplied through the cooling part cools the reducing agent dosing module.

The cooling device for a reducing agent dosing module according to the prior art has a problem in that there is required a separate space for the installation of the cooling tank in a vehicle. Furthermore, the cooling device for a reducing agent dosing module according to the prior art has a problem in that the bubbles generated due to the vaporization of cooling fluid supplied to the reducing agent dosing module are not smoothly discharged through the cooling part. Accordingly, the cooling device for a reducing agent dosing module according to the prior art has a problem in that the cooling efficiency for the reducing agent dosing module is reduced.

SUMMARY

The present disclosure has been conceived to overcome the above-described problems, and is intended to provide a cooling device for a reducing agent dosing module that may cool a reducing agent dosing module even when an engine is stopped.

In order to solve the above problems, the present disclosure may include the following configuration.

The present disclosure may include: a first cooling part connected to a reducing agent dosing module; and a second cooling part connected to a cooling fluid line, and configured to receive cooling fluid from the cooling fluid line. The second cooling part may be formed to have an inner diameter larger than that of the first cooling part so that the bubbles generated due to the vaporization of cooling fluid are discharged.

According to the present disclosure, the following effect may be achieved.

The present disclosure is implemented such that the bubbles generated due to the vaporization of the cooling fluid are discharged through the second cooling part, thereby preventing the cooling efficiency for the reducing agent dosing module from being reduced even when an engine is stopped.

DETAILED DESCRIPTION

Embodiments of a board connector according to the present disclosure will be described in detail below with reference to the accompanying drawings.

Figure 1:
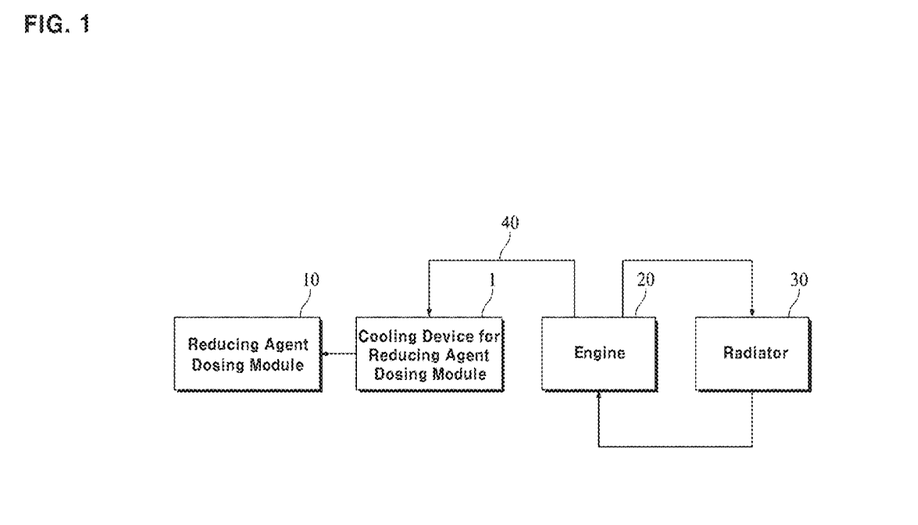
FIG. 1 is a schematic flowchart showing the flow of cooling fluid in a cooling device for a reducing agent dosing module according to the present disclosure.
Figure 2:
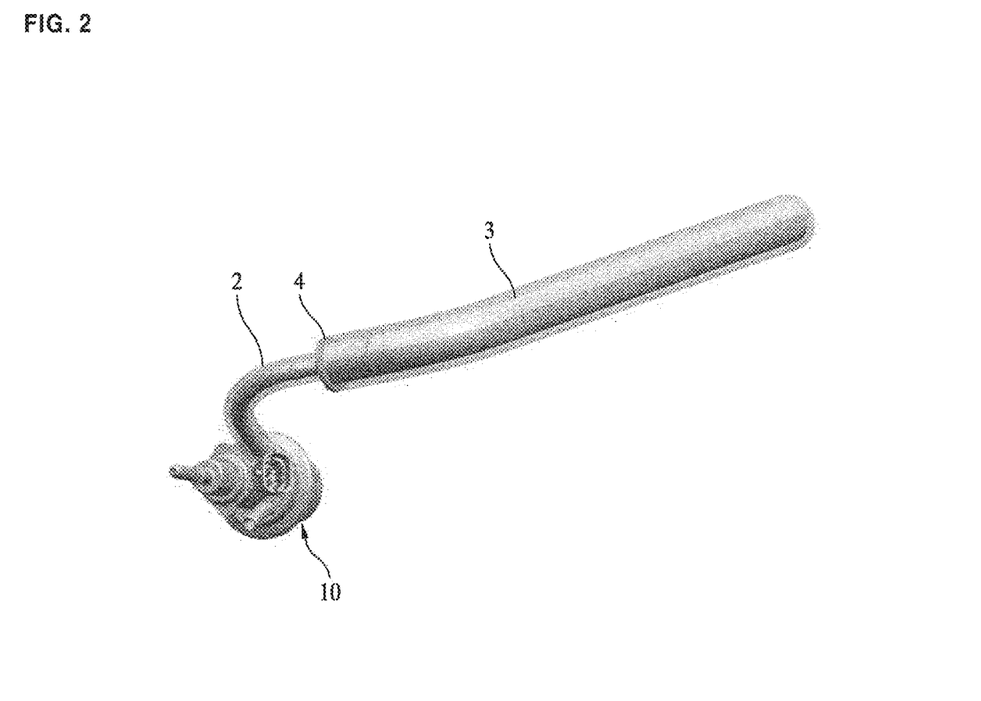
FIG. 2 is a schematic perspective view of the cooling device for a reducing agent dosing module according to the present disclosure.
Figure 3:
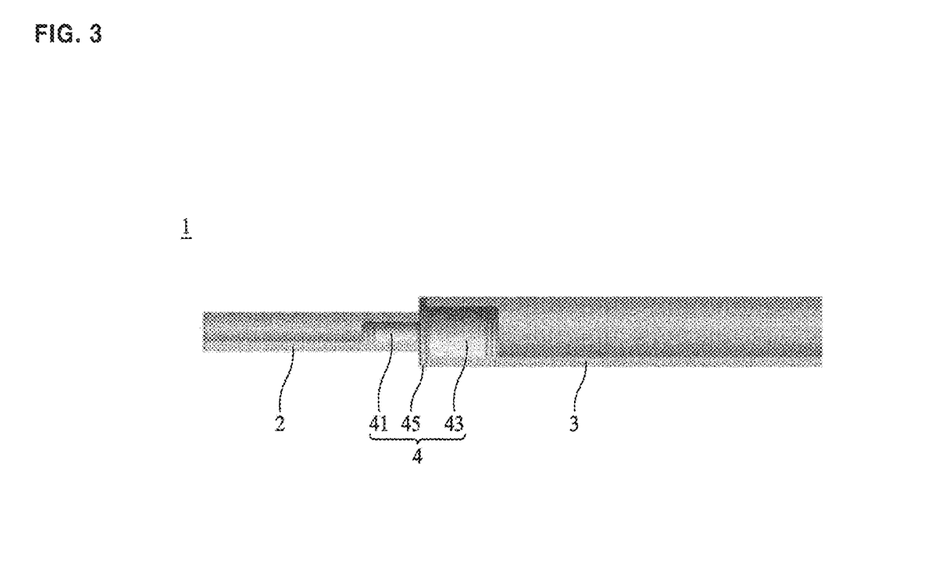
FIG. 3 is a schematic conceptual diagram of the cooling device for a reducing agent dosing module according to the present disclosure.
Figure 4:
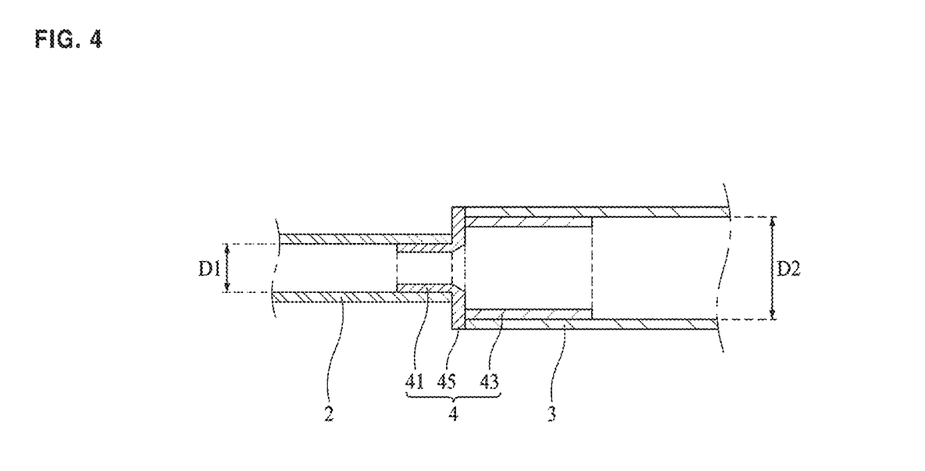
FIG. 4 is a conceptual diagram showing the inner diameters of first and second cooling parts in the cooling device for a reducing agent dosing module according to the present disclosure.
Figure 5:
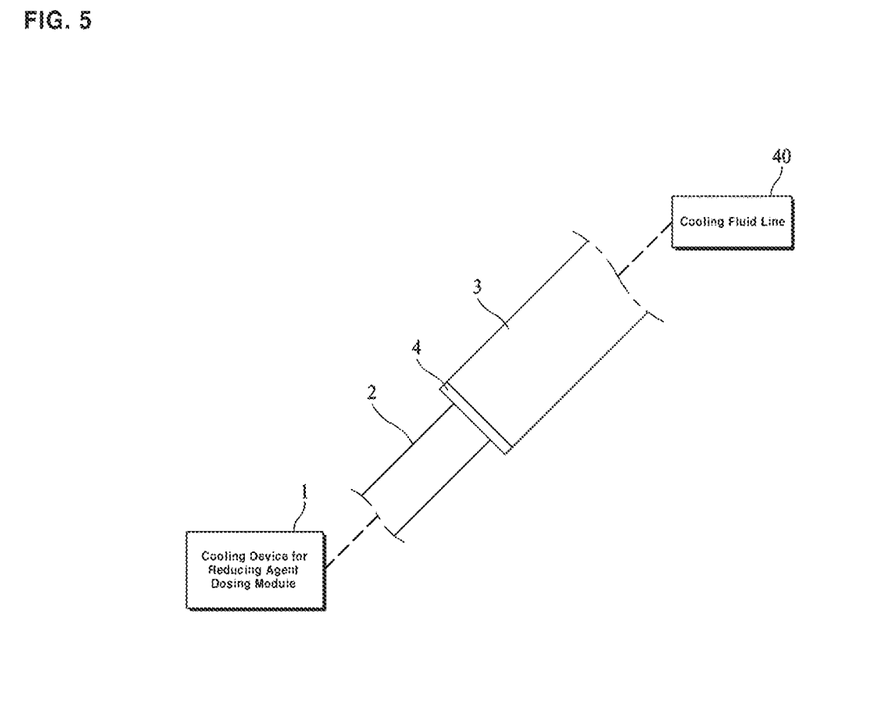
FIG. 5 is a conceptual diagram showing a state in which the cooling device for a reducing agent dosing module according to the present disclosure is disposed in the direction in which gravity acts.

Referring to FIG. 1, a cooling device 1 for a reducing agent dosing module according to the present disclosure may be used in a vehicle (not shown) that uses diesel as its main fuel. The vehicle may include a truck, an agricultural work vehicle, etc.

The vehicle includes an engine 20 and a radiator 30.

The engine 20 generates driving force so that the vehicle can move. In the process in which the engine 20 is operated, cooling fluid circulates around the engine 20 to prevent the overheating of the engine 20. In this case, the cooling fluid may refer to coolant injected into a vehicle, etc.

The radiator 30 cools the cooling fluid discharged from the engine 20. The cooling fluid cooled through the radiator 30 may be re-supplied to the engine 20 and reused as cooling fluid. In this manner, the vehicle may be implemented to have a cooling circulation structure that, when the cooling of the engine 20 is required, cools the cooling fluid, discharged from the engine 20, using the radiator 30 and then cools the engine 20 using the cooled cooling fluid.

Referring to FIG. 1, the vehicle may include a cooling fluid line 40 that is connected to the engine 20. The cooling fluid line 40 may receive cooling fluid from the engine 20. When the engine 20 is operated, the cooling fluid circulating through the engine 20 may continue to be supplied to the cooling fluid line 40. In this case, overheated cooling fluid may be supplied to the cooling fluid line 40 after circulating through the engine 20. When the cooling fluid line 40 is connected to the engine 20, the cooling device 1 for a reducing agent dosing module according to the present disclosure may cool the reducing agent dosing module 10 using the cooling fluid overheated in the engine 20. Since the reducing agent dosing module 10 is subjected to a temperature higher than that of the overheated cooling fluid, it may be cooled by the overheated cooling fluid. Although the cooling fluid line 40 is shown as connected to the engine 20 in FIG. 1, the present disclosure is not limited thereto, but the cooling fluid line 40 may be connected to the radiator 30. When the cooling fluid line 40 is connected to the radiator 30, the cooling device 1 for a reducing agent dosing module according to the present disclosure may cool the reducing agent dosing module 10 using the cooling fluid cooled in the radiator 30.

Meanwhile, when the engine 20 is stopped, the supply of cooling fluid to the cooling fluid line 40 may be blocked. Accordingly, in the cooling device 1 for a reducing agent dosing module according to the present disclosure, the additional supply of the cooling fluid may be blocked when the engine 20 is stopped. Accordingly, the cooling device 1 for a reducing agent dosing module according to the present disclosure may be implemented to cool the reducing agent dosing module 10 using the already supplied cooling fluid.

Referring to FIGS. 1 to 4, the cooling device 1 for a reducing agent dosing module according to the present disclosure may include a first cooling part 2 and a second cooling part 3.

The first cooling part 2 is connected to the reducing agent dosing module 10. The first cooling part 2 may supply cooling fluid to the reducing agent dosing module 10. The cooling fluid contained in the first cooling part 2 may be used to cool the reducing agent dosing module 10. The first cooling part 2 may receive cooling fluid from the second cooling part 3. The cooling fluid contained in the second cooling part 3 may flow to the reducing agent dosing module 10 through the first cooling part 2. The cooling fluid supplied to the reducing agent dosing module 10 may be vaporized after cooling the reducing agent dosing module 10. Accordingly, in the cooling device 1 for a reducing agent dosing module according to the present disclosure, the cooling fluid is vaporized inside the reducing agent dosing module 10, and generated bubbles may be discharged to the first cooling part 2. The first cooling part 2 may be implemented in the form of a hollow tube to allow fluid to move therethrough. For example, the first cooling part 2 may be implemented as a hose, a pipe, or the like.

The second cooling part 3 is connected to the cooling fluid line 40 and receives cooling fluid from the cooling fluid line 40. The second cooling part 3 may be formed to have an inner diameter D2 larger than the inner diameter D1 of the first cooling part 2 so that the bubbles generated due to vaporization of the cooling fluid are easily discharged from the first cooling part 2. Accordingly, the cooling device 1 for a reducing agent dosing module according to the present disclosure may be implemented such that the second cooling part 3 has an inner diameter sufficient to discharge the bubbles generated in the first cooling part 2. Therefore, the cooling device 1 for a reducing agent dosing module according to the present disclosure may smoothly discharge bubbles through the second cooling part 3 and thus prevent the supply of the cooling fluid to the first cooling part 2 from being interrupted due to bubbles, thereby preventing the reducing agent dosing module 10 from being overheated when the engine 20 is stopped.

The second cooling part 3 may receive cooling fluid from the cooling fluid line 40 and supply the cooling fluid to the first cooling part 2. The second cooling part 3 may be implemented in the form of a hollow tube to allow fluid to move therethrough. For example, the second cooling part 3 may be implemented as a hose, a pipe, or the like.

Referring to FIGS. 1 to 5, the second cooling part 3 may be disposed at a higher position than the first cooling part 2 so that cooling fluid is supplied to the first cooling part 2 by gravity. Accordingly, the cooling device 1 for a reducing agent dosing module according to the present disclosure may be implemented to allow the cooling fluid contained in the second cooling part 3 to be moved to the first cooling part 2 by gravity even when the engine 20 is stopped. Therefore, the cooling device 1 for a reducing agent dosing module according to the present disclosure may supply cooling fluid to the first cooling part 2 through the second cooling part 3 even after the engine 20 has been stopped, thereby preventing the reducing agent dosing module 10 from being overheated.

Meanwhile, referring to FIGS. 1 to 6, the first cooling part 2 may include a first flow path 21, and the second cooling part 3 may include a second flow path 31.

Figure 6:
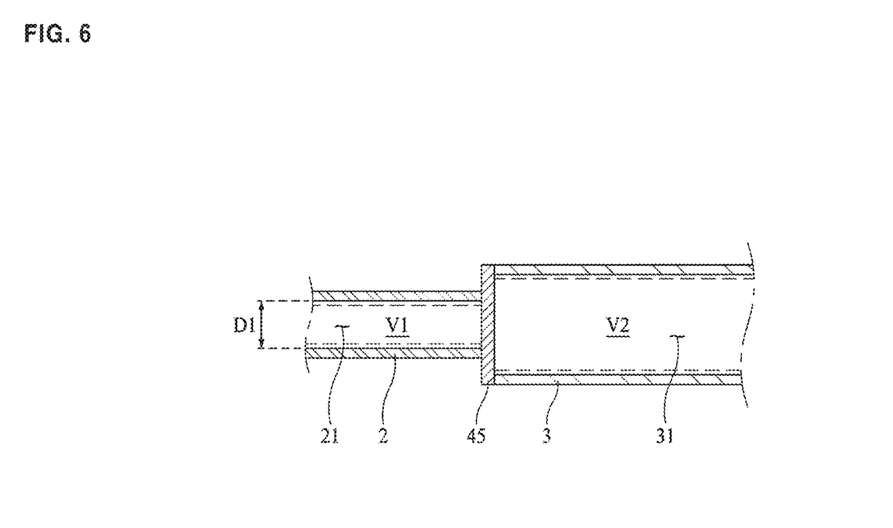
FIG. 6 is a schematic conceptual diagram showing the volumes of first and second flow paths in the cooling device for a reducing agent dosing module according to the present disclosure.

The first flow path 21 is intended to allow cooling fluid to flow therethrough. The first flow path 21 may allow cooling fluid, supplied from the second cooling part 3, to flow therethrough. The cooling fluid contained in the second cooling part 3 may be supplied to the reducing agent dosing module 10 through the first flow path 21. In this case, the first flow path 21 may have a predetermined volume for the flow of cooling fluid.

The second flow path 31 is intended to receive the cooling fluid supplied from the cooling fluid line 40. The second flow path 31 may have a predetermined volume for the accommodation of cooling fluid. In this case, the volume V2 of the second flow path 31 may be larger than the volume V1 of the first flow path 21. Accordingly, the cooling device 1 for a reducing agent dosing module according to the present disclosure may be implemented to ensure a volume that can accommodate the cooling fluid corresponding to the heat capacity required for cooling the reducing agent dosing module 10 when the engine 20 is stopped. Therefore, the cooling device 1 for a reducing agent dosing module according to the present disclosure continues to receive cooling fluid in the case of the vaporization of the remaining cooling fluid even when the engine 20 is stopped, thereby preventing the cooling efficiency for the reducing agent dosing module 10 from being reduced.

The second flow path 31 may accommodate cooling fluid, and may also allow cooling fluid to flow therethrough. For example, the second flow path 31 may receive cooling fluid from the cooling fluid line 40 when the engine 20 is operated, and the cooling fluid may flow through the second flow path 31. The second flow path 31 may accommodate the cooling fluid already supplied from the cooling fluid line 40 when the engine 20 is stopped.

In this manner, the second cooling part 3 may be used as a flow path through which cooling fluid flows when the engine 20 is operated, and may also be used as a storage space in which cooling fluid is accommodated when the engine 20 is stopped. Accordingly, the cooling device 1 for a reducing agent dosing module according to the present disclosure may be implemented to allow cooling fluid to be supplied to the reducing agent dosing module 10 without having a separate storage space for accommodating cooling fluid in the vehicle because the second cooling part 3 is used as a flow path for cooling fluid and a storage space for cooling fluid. Therefore, the manufacturing cost of the cooling device 1 for a reducing agent dosing module according to the present disclosure may be reduced.

Referring to FIGS. 1 to 7, the cooling device 1 for a reducing agent dosing module according to the present disclosure may include a coupling part 4.

Figure 7:
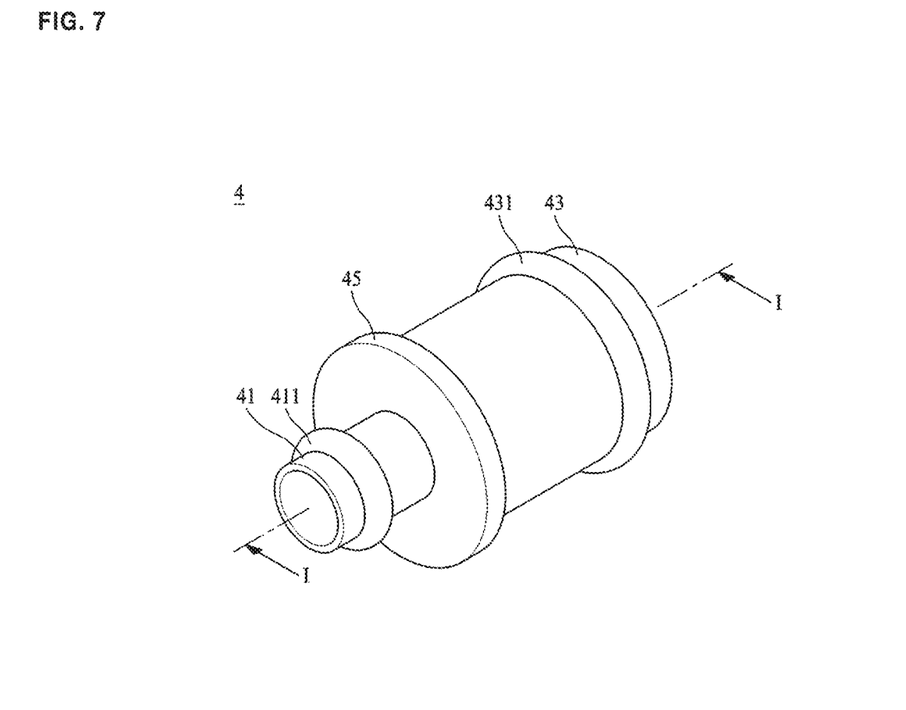
FIG. 7 is a schematic perspective view of a coupling part in the cooling device for a reducing agent dosing module according to the present disclosure.

The coupling part 4 connects the first cooling part 2 and the second cooling part 3. The distance by which the coupling part 4 is spaced apart from the reducing agent dosing module 10 may be shorter than the distance by which the coupling part 4 is spaced apart from the cooling fluid line 40. That is, the first cooling part 2 may be formed to be shorter than the second cooling part 3. Accordingly, in the cooling device 1 for a reducing agent dosing module according to the present disclosure, even when the engine 20 is stopped, the cooling fluid accommodated in the first cooling part 2 may be supplied to the reducing agent dosing module 10 by the pressure applied by the cooling fluid accommodated in the second cooling part 3. Therefore, the cooling device 1 for a reducing agent dosing module according to the present disclosure may prevent the reducing agent dosing module 10 from being overheated through the cooling fluid contained in the first cooling part 2 even when the engine 20 is stopped.

The distance connecting the engine 20 and the reducing agent dosing module 10 will be set within a predetermined range. As the length of the first cooling part 2 and the cooling fluid line 40 is formed to be shorter, the length of the second cooling part 3 may be formed to be longer. Accordingly, the cooling device 1 for a reducing agent dosing module according to the present disclosure may be implemented such that a larger amount of cooling fluid is accommodated in the second cooling part 3. Therefore, in the cooling device 1 for a reducing agent dosing module according to the present disclosure, the pressure that the cooling fluid contained in the second cooling part 3 applies onto the cooling fluid contained in the first cooling part 2 may be made higher. Through this, the cooling device 1 for a reducing agent dosing module according to the present disclosure allows the cooling fluid contained in the first cooling part 2 to be more smoothly supplied to the reducing agent dosing module 10.

The coupling part 4 may be coupled to each of the first cooling part 2 and the second cooling part 3. The coupling part 4 may be disposed between the first cooling part 2 and the second cooling part 3 and couple the first cooling part 2 and the second cooling part 3. Accordingly, the coupling part 4 may connect the first flow path 21 formed in the first cooling part 2 and the second flow path 31 formed in the second cooling part 3. In this case, the coupling part 4 may couple the first cooling part 2 and the second cooling part 3 so that the first flow path 21 and the second flow path 31 communicate with each other. Therefore, in the cooling device 1 for a reducing agent dosing module according to the present disclosure, the cooling fluid contained in the second cooling part 3 may flow to the first cooling part 2 through the coupling part 4.

Referring to FIGS. 1 to 8, the coupling part 4 may include a first coupling member 41 and a first coupling flow path 42.

Figure 8:
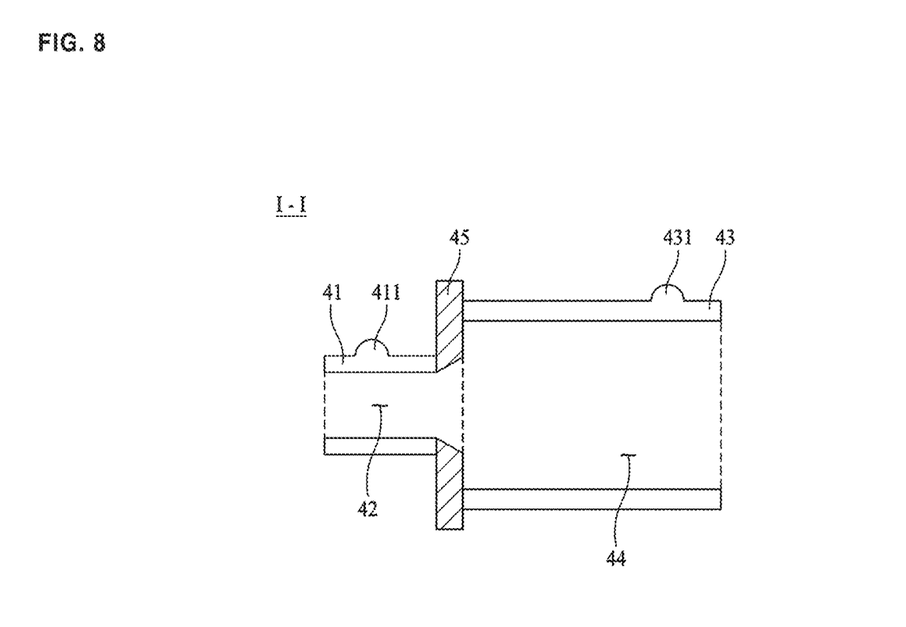
FIG. 8 is a schematic sectional view taken along line I-I of FIG. 7 in the cooling device for a reducing agent dosing module according to the present disclosure.

The first coupling member 41 is coupled to the first cooling part 2. The first coupling member 41 may be inserted into the first cooling part 2. In this case, the first coupling member 41 may be inserted toward the first flow path 21. Accordingly, the first coupling member 41 may be coupled with the first cooling part 2. Therefore, in the cooling device 1 for a reducing agent dosing module according to the present disclosure, the first cooling part 2 and the coupling part 4 may be connected to each other through the first coupling member 41.

The first coupling flow path 42 is formed through the first coupling member 41. The first coupling flow path 42 may be formed inside the first coupling member 41. The first coupling flow path 42 may communicate with the first flow path 21. Accordingly, in the cooling device for a reducing agent dosing module according to the present disclosure, the cooling fluid may flow from the first coupling flow path 42 to the first flow path 21. The first coupling flow path 42 and the second coupling flow path 44 may communicate with each other. Accordingly, in the cooling device 1 for a reducing agent dosing module according to the present disclosure, cooling fluid may flow from the second coupling flow path 44 to the first coupling flow path 42. Therefore, in the cooling device 1 for a reducing agent dosing module according to the present disclosure, cooling fluid may flow from the second coupling flow path 44 to the first flow path 21 through the first coupling flow path 42.

Referring to FIGS. 1 to 8, the coupling part 4 may include a second coupling member 43 and a second coupling flow path 44.

The second coupling member 43 is coupled to the second cooling part 3. The second coupling member 43 may be inserted into the second cooling part 3. In this case, the second coupling member 43 may be inserted toward the second flow path 31. Accordingly, the second coupling member 43 may be coupled with the second cooling part 3. Therefore, in the cooling device 1 for a reducing agent dosing module according to the present disclosure, the second cooling part 3 and the coupling part 4 may be connected to each other through the second coupling member 43.

The second coupling flow path 44 is formed through the second coupling member 43. The second coupling flow path 44 is formed inside the second coupling member 43. The second coupling flow path 44 may communicate with the second flow path 31. Accordingly, the cooling device 1 for a reducing agent dosing module according to the present disclosure allows cooling fluid to flow from the second flow path 31 to the second coupling flow path 44. Furthermore, the second coupling flow path 44 may communicate with the first coupling flow path 42. Accordingly, in the cooling device 1 for a reducing agent dosing module according to the present disclosure, the cooling fluid may flow from the second coupling flow path 44 to the first coupling flow path 42. Therefore, in the cooling device 1 for a reducing agent dosing module according to the present disclosure, the cooling fluid may flow from the second flow path 31 to the first coupling flow path 42 through the second coupling flow path 44.

Referring to FIGS. 7 and 8, the coupling part 4 may include a flange 45.

The flange 45 protrudes from the second coupling member 43. The flange 45 is formed to have an outer diameter larger than the inner diameter of the second cooling part 3, and limits the depth at which the second coupling member 43 is inserted into the second cooling part 3. Accordingly, the cooling device 1 for a reducing agent dosing module according to the present disclosure may be implemented to prevent the second cooling part 3 from being connected to the first coupling member 41 in the process of coupling the second cooling part 3 to the second coupling member 43. Therefore, the cooling device 1 for a reducing agent dosing module according to the present disclosure may improve the ease of the work of coupling the second cooling part 3 to the second coupling member 43 through the flange 45. The flange 45 may be coupled to each of the first coupling member 41 and the second coupling member 43. In this case, the first cooling part 2 may be coupled onto one surface of the flange 45 on which the first coupling member 41 is formed. The second cooling part 3 may be coupled onto the other surface of the flange 45 on which the second coupling member 43 is formed. In this case, one surface of the flange 45 and the other surface of the flange 45 may refer to the surfaces that are formed in opposite directions.

Meanwhile, the outer diameter of the second coupling member 43 may be formed to be larger than the inner diameter of the first coupling member 41. In this case, the outer diameter of the flange 45 may be formed larger than the inner diameter of the second coupling member 43. Accordingly, the first cooling part 2 may be coupled to the coupling part 4 so that it is disposed between the outer diameter of the flange 45 and the first coupling member 41. Accordingly, the cooling device 1 for a reducing agent dosing module according to the present disclosure may be implemented such that the flange 45 and the first cooling part 2 are closely coupled to each other. Therefore, the cooling device 1 for a reducing agent dosing module according to the present disclosure may prevent cooling fluid from leaking to the outside during the process of flowing from the coupling part 4 to the first cooling part 2.

Furthermore, the second cooling part 3 may be coupled to the coupling part 4 so that it is disposed between the outer diameter of the flange 45 and the second coupling member 43. Accordingly, the cooling device 1 for a reducing agent dosing module according to the present disclosure may be implemented such that the flange 45 and the second cooling part 3 are closely coupled to each other. Therefore, the cooling device 1 for a reducing agent dosing module according to the present disclosure may prevent cooling fluid from leaking to the outside during the process of flowing from the second cooling part 3 to the coupling part 4.

Referring to FIGS. 1 to 9, the coupling part 4 may include a first coupling protrusion 411 and a first fixing member 412.

Figure 9:
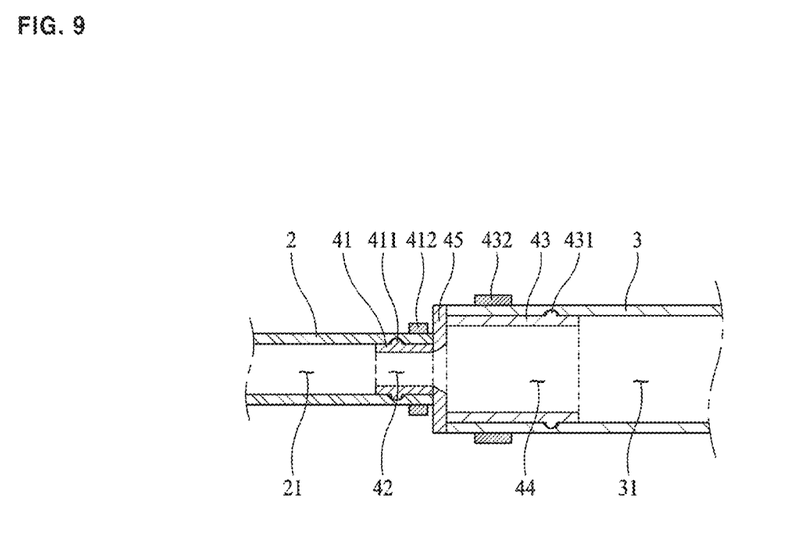
FIG. 9 is a schematic conceptual diagram showing a state in which the first and second cooling parts are coupled to the coupling part in the cooling device for a reducing agent dosing module according to the present disclosure.

The first coupling protrusion 411 protrudes from the outer surface of the first coupling member 41. The first fixing member 412 is disposed between the first coupling protrusion 411 and the second coupling member 43 and fixes the first cooling part 2 and the first coupling member 41. The first coupling protrusion 411 may support the first fixing member 412 so that the distance at which the first fixing member 412 can move toward the reducing agent dosing module 10 is limited. Accordingly, the cooling device 1 for a reducing agent dosing module according to the present disclosure is coupled to the first coupling member 41 so that the movement of the first cooling part 2 is restricted by the first fixing member 412. Therefore, the cooling device 1 for a reducing agent dosing module according to the present disclosure may prevent the first cooling part 2 from being separated from the first coupling member 41 through the first fixing member 412. The first fixing member 412 may be implemented as a member such as a clamp that fixes a pipe, a hose, or the like.

Referring to FIGS. 1 to 9, the coupling part 4 may include a second coupling protrusion 431 and a second fixing member 432.

The second coupling protrusion 431 protrudes from the outer surface of the second fixing member 432. The second fixing member 432 is disposed between the second coupling protrusion 431 and the first coupling member 41, and fixes the second cooling part 3 and the second coupling member 43. The second coupling protrusion 431 may support the first fixing member 412 so that the distance at which the second fixing member 432 can move toward the cooling fluid line 40 is limited. Accordingly, the cooling device 1 for a reducing agent dosing module according to the present disclosure may be coupled to the second coupling member 43 so that the movement of the second cooling part 3 is restricted by the second fixing member 432. Therefore, the cooling device 1 for a reducing agent dosing module according to the present disclosure may prevent the second cooling part 3 from being separated from the second coupling member 43 through the second fixing member 432. The second fixing member 432 may be implemented as a member such as a clamp that fixes a pipe, a hose, or the like.

The present disclosure described above is not limited to the above-described embodiments and the accompanying drawings. It will be apparent to those having ordinary skill in the art to which the present disclosure pertains that various substitutions, modifications, and alterations may be made without departing from the technical spirit of the present disclosure.

The invention claimed is:

1. A cooling device for a reducing agent dosing module, the cooling device comprising:
    a first cooling part connected to a reducing agent dosing module; and
    a second cooling part connected to a cooling fluid line, and configured to receive cooling fluid from the cooling fluid line;
    wherein the second cooling part is formed to have an inner diameter larger than an inner diameter of the first cooling part so that bubbles generated due to vaporization of cooling fluid are discharged,
    wherein the second cooling part is disposed at a higher position than the first cooling part so that cooling fluid is supplied to the first cooling part by gravity, wherein a first end of the second cooling part is connected to the cooling fluid line, and a second end of the second cooling part is connected to the first cooling part, and the second cooling part is disposed to be inclined with respect to a horizontal plane perpendicular to a direction in which gravity acts, and is disposed to be inclined continuously downward from the first end of the second cooling part to the second end of the second cooling part, so that the second cooling part is continuously lowered in height, and wherein an inner diameter of the first cooling part is constant over entire length thereof, and an inner diameter of the second cooling part is constant over entire length thereof, so that a step is formed at a portion where the first cooling part and the second cooling part are connected, wherein the first cooling part and the second cooling part are respectively in a form of a hollow tube, and wherein the first cooling part and the second cooling part are coaxially coupled to each other.

2. The cooling device of claim 1, wherein:

the first cooling part includes a first flow path configured to allow cooling fluid to flow therethrough;

the second cooling part includes a second flow path configured to accommodate cooling fluid supplied from the cooling fluid line; and a volume of the second flow path is larger than a volume of the first flow path.

3. A cooling device for a reducing agent dosing module, the cooling device comprising:

a first cooling part connected to a reducing agent dosing module; and a second cooling part connected to a cooling fluid line, and configured to receive cooling fluid from the cooling fluid line;

wherein the second cooling part is formed to have an inner diameter larger than an inner diameter of the first cooling part so that bubbles generated due to vaporization of cooling fluid are discharged, wherein the second cooling part is disposed at a higher position than the first cooling part so that cooling fluid is supplied to the first cooling part by gravity, wherein a first end of the second cooling part is connected to the cooling fluid line, and a second end of the second cooling part is connected to the first cooling part, and the second cooling part is disposed to be inclined with respect to a horizontal plane perpendicular to a direction in which gravity acts, and is disposed to be inclined continuously downward from the first end of the second cooling part to the second end of the second cooling part, so that the second cooling part is continuously lowered in height, wherein an inner diameter of the first cooling part is constant over entire length thereof, and an inner diameter of the second cooling part is constant over entire length thereof, so that a step is formed at a portion where the first cooling part and the second cooling part are connected, wherein the first cooling part and the second cooling part are respectively in a form of a hollow tube, and wherein a length of the first cooling part is shorter than that of the second cooling part.

4. A cooling device for a reducing agent dosing module, the cooling device comprising:

a first cooling part connected to a reducing agent dosing module; and a second cooling part connected to a cooling fluid line, and configured to receive cooling fluid from the cooling fluid line;

wherein the second cooling part is formed to have an inner diameter larger than an inner diameter of the first cooling part so that bubbles generated due to vaporization of cooling fluid are discharged, wherein the second cooling part is disposed at a higher position than the first cooling part so that cooling fluid is supplied to the first cooling part by gravity, wherein a first end of the second cooling part is connected to the cooling fluid line, and a second end of the second cooling part is connected to the first cooling part, and the second cooling part is disposed to be inclined with respect to a horizontal plane perpendicular to a direction in which gravity acts, and is disposed to be inclined continuously downward from the first end of the second cooling part to the second end of the second cooling part, so that the second cooling part is continuously lowered in height, and wherein an inner diameter of the first cooling part is constant over entire length thereof, and an inner diameter of the second cooling part is constant over entire length thereof, so that a step is formed at a portion where the first cooling part and the second cooling part are connected, wherein the first cooling part and the second cooling part are respectively in a form of a hollow tube, wherein the first cooling part and the second cooling part are coaxially coupled to each other, and wherein a length of the first cooling part is shorter than that of the second cooling part.

* * * * *